US012144080B2

(12) United States Patent
McMillan

(10) Patent No.: US 12,144,080 B2
(45) Date of Patent: Nov. 12, 2024

(54) UV LED PRODUCT AUTOMATIC LIFESPAN INCREASER

(71) Applicant: Epic Universal Technologies, LLC, Hickory, NC (US)

(72) Inventor: George Erik McMillan, Hickory, NC (US)

( * ) Notice: Subject to any disclaimer, the term of this patent is extended or adjusted under 35 U.S.C. 154(b) by 0 days.

(21) Appl. No.: 18/151,267

(22) Filed: Jan. 6, 2023

(65) Prior Publication Data

US 2023/0217567 A1 Jul. 6, 2023

Related U.S. Application Data

(60) Provisional application No. 63/297,047, filed on Jan. 6, 2022.

(51) Int. Cl.
*H05B 45/40* (2020.01)
*H05B 45/52* (2020.01)

(52) U.S. Cl.
CPC .................................... *H05B 45/52* (2020.01)

(58) Field of Classification Search
CPC ...................................................... H05B 45/52
See application file for complete search history.

(56) References Cited

U.S. PATENT DOCUMENTS

| | | | | |
|---|---|---|---|---|
| 9,750,098 | B2 * | 8/2017 | Miskin | H05B 45/40 |
| 10,197,224 | B1 * | 2/2019 | Macias | F21V 7/005 |
| 2012/0306390 | A1 * | 12/2012 | Li | H05B 45/10 315/192 |
| 2020/0330638 | A1 * | 10/2020 | Hsu-Luk | A61L 9/20 |
| 2021/0318008 | A1 * | 10/2021 | Szoradi | F24F 11/56 |
| 2022/0047761 | A1 * | 2/2022 | Lin | A61L 9/20 |
| 2022/0152265 | A1 * | 5/2022 | Eggers | A61L 9/20 |

* cited by examiner

*Primary Examiner* — Kurtis R Bahr

(74) *Attorney, Agent, or Firm* — Lambert Shortell & Connaughton; David J. Connaughton, Jr.

(57) ABSTRACT

An apparatus for extending the lifetime of an LED device is provided. In some embodiments, the apparatus includes an LED printed circuit board (PCB) having two or more LED circuits thereon, where each of the two or more LED circuits includes a plurality of LED emitters. The apparatus further includes a module electrically coupled to the LED PCB that has a selector configured to move between two or more positions, each position activating one of the one or more LED circuits and a relay configured to control a movement of the selector between the two or more positions based on a received input. Additionally, the apparatus includes a power supply that is electrically coupled to the relay.

24 Claims, 9 Drawing Sheets

UV LED PRODUCT AUTOMATIC LIFESPAN INCREASER

CROSS-REFERENCE TO RELATED APPLICATION

This application claims the benefit of U.S. Provisional Patent Application No. 63/297,047, titled "UV LED Product Automatic Lifespan Increaser," which was filed on Jan. 6, 2022 and is incorporated herein by reference in its entirety.

FIELD OF TECHNOLOGY

The present disclosure relates generally to ultraviolet (UV) light emitting diode (LED) technology and, more specifically, to an apparatus and method for increasing the lifespan of UV LED emitters used in UV LED devices.

BACKGROUND

Ultraviolet (UV) is a form of electromagnetic radiation with wavelength between 100 nm and 400 nm, shorter than that of visible light, but longer than X-rays. UV radiation—which is divided into three bands: UVA (315-400 nm), UVB (280-315 nm), and UVC (100-280 nm)—is present in sunlight, and constitutes about 10% of the total electromagnetic radiation output from the Sun. UV light interacts with matter in a variety of ways. For example, short-wave UV light (e.g., UVC light) deactivates the DNA and RNA of microorganisms like bacteria, viruses, and other pathogens, and disrupts their ability to multiply and cause diseases. Due to this effect, UVC light can be used to quickly (e.g., within minutes) sterilize objects, large surfaces, or even the air in hospitals, medical centers, food plants, office spaces, etc. Advantageously, the UVC treatment leaves no residue, and thus, the treated object or area can be immediately used after sterilization. The UVC light used in sterilization applications has a wavelength between 200 and 280 nanometers, and more preferably a wavelength of 253.7 nm.

In recent years, LEDs have paved the way in the lighting market because they exhibit better energy efficiency and improved lifetime compared to fluorescent lamps. For at least these reasons, it is highly desirable to generate UV light using LEDs rather than fluorescent lamps. However, currently, the LEDs producing UV light exhibit a low power output and have a lifespan that is only comparable to that of UV fluorescent lamps. Further, the manufacturing cost of the LED UV chips is elevated compared to that of fluorescent lamps.

To make LED UV technology competitive, one of two things need to occur: (i) either their manufacturing cost becomes comparable to that of the UV fluorescent lamps or (ii) their lifespan is sufficiently long so that the accumulated energy savings for the duration of their lifetime offsets their purchasing cost.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Apparatus and methods for increasing the lifetime of UV LED devices is disclosed herein. According to some embodiments, the apparatus and methods described herein can n-tuple the lifetime of UV LED devices. By way of example and not limitation, the apparatus and method described herein can double, triple, quadruple, or quintuple the lifetime of the UV LED devices. In some embodiments, this is accomplished without limiting the current passing through each emitter, which is the conventional way to extend the lifetime of the UV LED devices, and without extending the life of each individual emitter.

In some embodiments, increasing the lifespan or lifetime of a UV LED device is achieved by first calculating the UV power required during the operation of the UV LED device, and determining the number of UV emitters required within a first circuit to meet that UV power level. Subsequently, one or more emitter circuits identical to the first circuit are paralleled with the first circuit to increase the total number of UV emitters in the UV LED device. This configuration forms an n-way circuit system (with n being an integer equal to or greater than two) on which only a single circuit is activated during operation to extend the lifetime of the entire UV LED device. For example, if 20,000 hours lifetime is required for a LED UV product having LED emitters rated for 10,000 hours, two sets of UV LED emitters can be paralleled together to form a two-circuit system that has an automatic A/B circuit alternating switching relay which switches between the two circuits (e.g., circuits A and B) to yield a 20,000 hours lifetime. This approach provides a manufacturer with flexibility to choose between a large number of circuits having low-lifetime UV emitters and a few number of circuits having high-lifetime UV emitters based on cost and the application requirements.

In some embodiments, the switching relay is used to switch between the LED circuits in the UV LED device. By way of example and not limitation, the relay may be actuated when the UV LED device is switched ON and OFF, when a pressure change or air flow change is detected in the surrounding air, when a predetermined time interval has elapsed, or any combination thereof.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
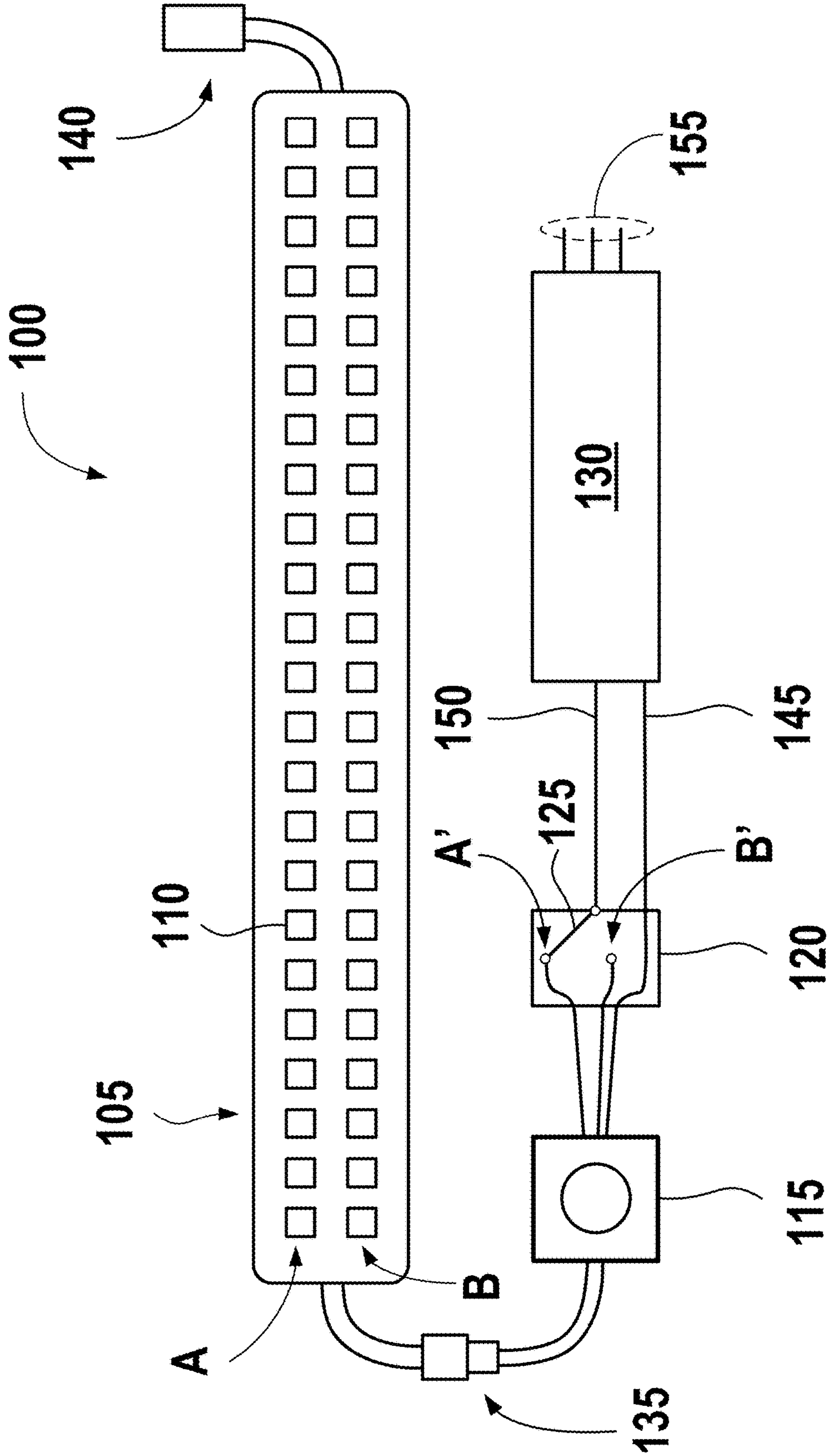
FIG. 1 is an illustration of a UV LED device with a two-circuit configuration, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Apparatus and methods for extending the lifetime of UV LED devices is presented. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

For example purposes, the UV LEDs will be described in the context of LEDs emitting in the UVB and UVC spectrum. However, this is not limiting, and the configurations presented herein are applicable to other types of LEDs, including LEDs emitting in the UVA or visible spectrum. By way of example and not limitation, the UV LED devices will be described in the context of a system used in Packaged Terminal Air Conditioner (PTAC) units or split-air air-conditioning systems for sterilization purposes—e.g., for removing pathogens from the air circulated within a room or within an enclosure. However, this is not limiting, and the configurations of the UV LED devices described herein can be standalone air sanitizing/purifying units or units integrated to other types of ventilation systems such as in locomotives, airplanes, cars, ships, and the like. Further, the configurations of the LED devices described herein can be non-sterilizing devices, such as devices generating visible light.

FIG. 1 is a UV LED device 100, according to some embodiments. UV LED device 100 includes a UV LED board 105 having UV LED emitters 110 configured in a two-circuit arrangement formed by circuits A and B. In some embodiments, UV LED board 105 is a printed circuitry board (PCB) or a metal core PCB (MCPCB) on which LED emitters 110 are mechanically attached and electrically connected to. It is to be understood that UV LED board includes any necessary electrical connections for the operation of LED emitters 110. Further, UV LED board 105 is configured so that the LED emitters 110 between circuits A and B can be activated independently. That is, the LED emitters 110 in circuit A can be operated independently from the emitters in circuit B. In some embodiments, only a single circuit may be operated at any given time—i.e., either A or B as discussed below.

According to some embodiments, the total number of LED emitters 110 selected for each of the circuits A and B is determined based on the power output of each emitter and the desired total power output of UV LED device 100. In other words, fewer or more LED emitters 110 may be used in each circuit depending on the power output of each LED emitter and the desired total output of the UV LED device 100.

As depicted in FIG. 1, circuits A and B are arranged as parallel rows in the form of linear strips. However, this is not limiting, and circuits A and B may be arranged in any desirable or suitable configuration. For example, circuits A and B may form concentric circles or may be arranged as parallel columns. These and other desirable and possible configurations are within the spirit and the scope of this disclosure.

UV LED board 105 is electrically coupled, via connection 135, to a safety occupancy motion sensor 115 configured to interrupt the operation of UV LED device 100 when the device is accidentally accessed to protect the user from the emitted UV light. By way of example and not limitation, safety occupancy motion sensor 115 may be a passive infrared sensor (PIR sensor), a microwave occupancy sensor, a motion sensor, or any suitable sensor configured to detect the presence of a person in the path of the emitted UV light.

Safety occupancy motion sensor 115 is electrically coupled to an automatic alternating circuit module 120 configured to activate circuits A and B in UV LED board 105 via a selector 125. According to some embodiments, when selector 125 is at position A', circuit A in UV LED board 105 is activated and, respectively, when selector 125 is at position B', circuit B is activated. In some embodiments, selector 125 toggles with the help of a relay (not shown in FIG. 1 for simplicity) between positions A' and B' each time automatic alternating circuit module 120 "senses" via the relay (which can be interposed between selector 125 and the positive connection 150 of power supply 130) that the power provided via power supply 130 is switched OFF and then back ON. In other words, automatic alternating circuit module 120 cycles to the next available circuit (e.g., A or B) each time the power from power supply 130 is switched OFF and then back ON. For example, assuming that selector 125 is initially at position A' while the power from power supply is 130 is ON, when the power is switched OFF, the automatic alternating circuit module 120 will toggle selector 125 from position A' to position B' when the power is turned back ON. Consequently, the LED emitters 110 in circuit B will be activated until the next time the power from power supply 130 is switched OFF and then back ON.

Advantageously, by performing the operation described above, the UV LED emitters 110 in each circuit A and B are alternating during each power OFF/ON cycle. Thus, UV LED emitters 110 in circuits A and B operate half of the total operating time, which means that the lifetime of the entire UV LED device 100 doubles.

By way of example and not limitation, selector 125 is electrically coupled, via the relay, to the positive connection 150 of the power supply 130 while safety occupancy motion sensor 115 is electrically coupled to power supply 130 via a common or negative connection 145. According to some embodiments, power supply 130 is also coupled to external power distributor and control equipment via connections 155. It is noted that UV LED board 105 may be electrically coupled to other boards or systems via optional connection 140.

It is to be appreciated that UV LED device 100 may include additional electrical or electronic components necessary for its function. However, these additional electrical and electronic components are not shown in FIG. 1 merely for simplicity. Such components may include, but are not limited to, controllers, relays, timers, processing units and modules, passive and active electronic devices, additional connections, and the like. These additional components are within the spirit and scope of this disclosure.

Further, and as discussed above, UV LED device 100 may be an integral part of a higher level system that controls the operation of UV LED device 100. By way of example and not limitation, UV LED device 100 may be electrically coupled to a fan motor so that when the PTAC or split-air system is not operating, the power of UV LED device 100 is turned OFF to reduce the operational cost. Alternatively, the automatic alternating circuit module 120 may be connected to a compressor of the PTAC or the split-air system so that every time the compressor cycles, the selector 125 may switch to the next circuit of emitters. In some embodiments, UV LED device 100 may be controlled independently of the PTAC or the split-air system—e.g., via a separate local or remote control unit or system.

Figure 2:
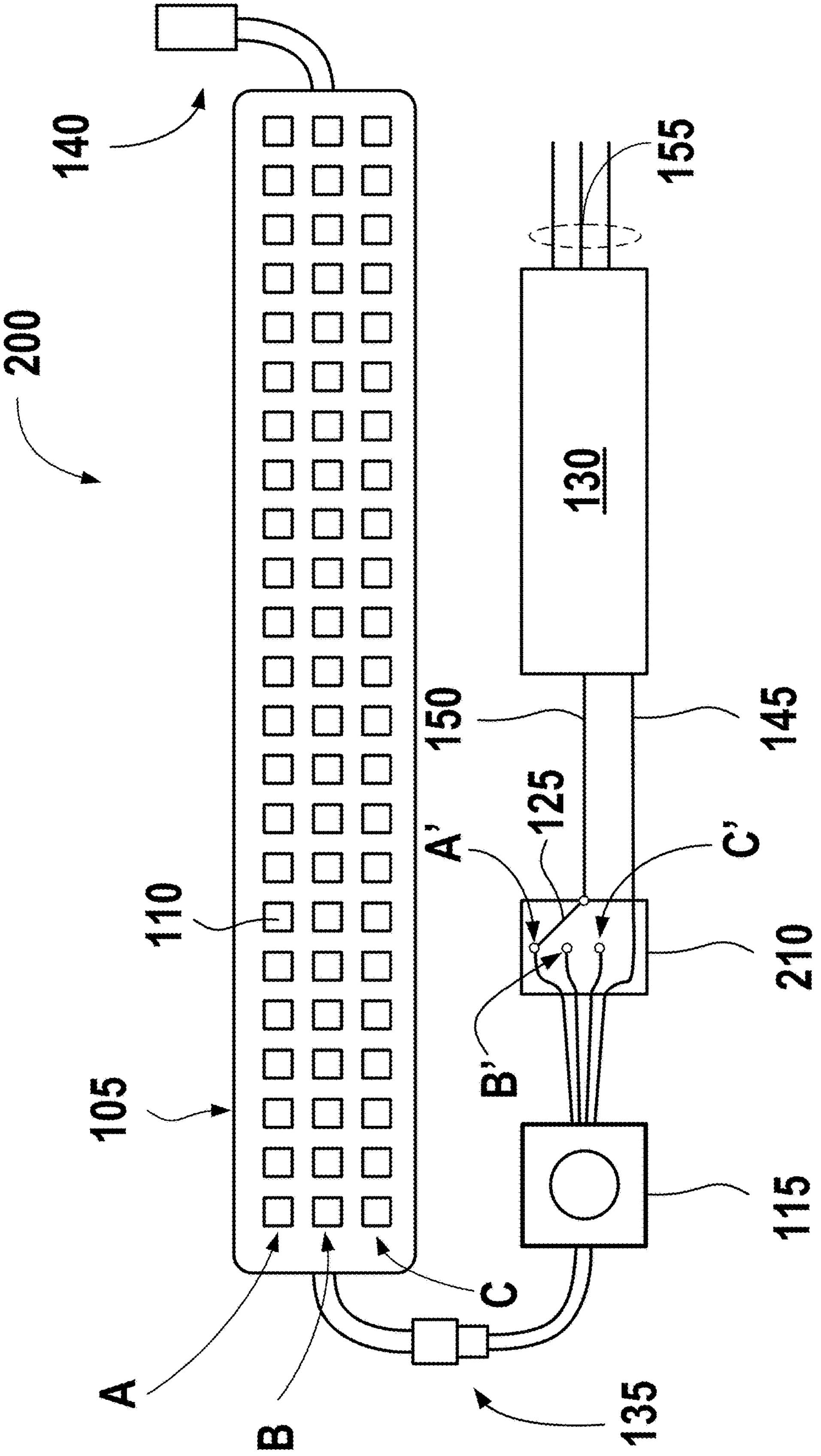
FIG. 2 is an illustration of a UV LED device with a tree-circuit configuration, in accordance with some embodiments.

According to some embodiments, FIG. 2 shows a UV LED device 200, which is a variant of UV LED device 100 shown in FIG. 1. The difference between UV LED devices 200 and 100 is that UV LED device 200 features a three-circuit configuration as opposed to a two-circuit configuration. Further, each of circuits A, B, and C includes an equal number of UV LED emitters 110. Because UV LED device 200 has a three-circuit configuration, it also includes an automatic alternating circuit module 210 with three available positions A', B', and C' for selector 125. According to some embodiments, UV LED device 200 operates in a similar fashion with UV LED device 100 with the exception that with the help of selector 125, UV LED device 200 can cycle through circuits A, B, and C for each power OFF/ON cycle. As a result, the lifetime of UV LED device 200 is further increased compared to UV LED device 100 because each circuit is operated one third of the time (e.g., ⅓) instead of half the time (e.g., ½).

Figure 3:
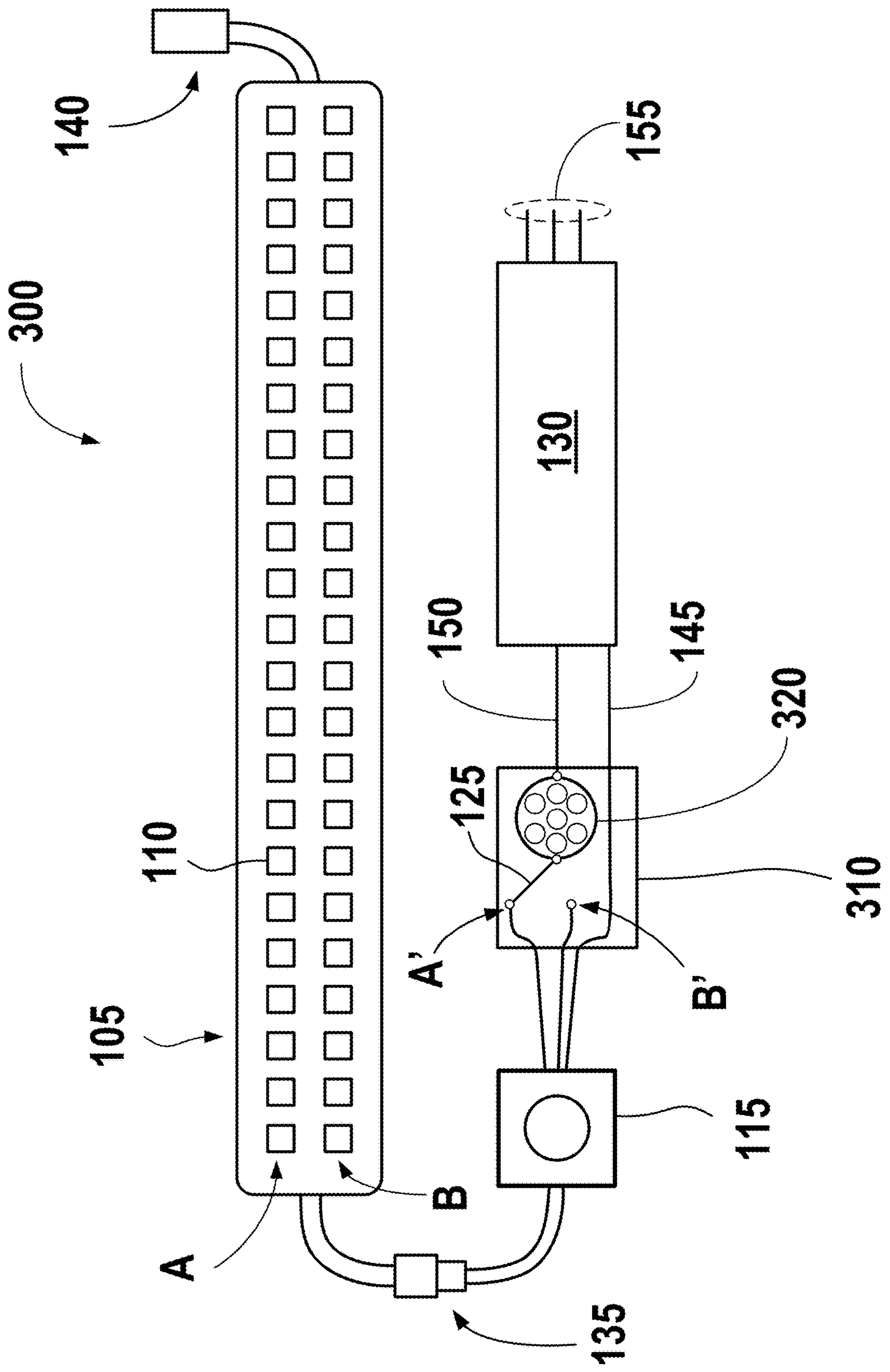
FIG. 3 is an illustration of a UV LED device with a two-circuit configuration, in accordance with some embodiments.

In yet another embodiment, FIG. 3 shows a UV LED device 300, which has identical components to UV LED device 100 shown in FIG. 1 with the exception of automatic alternating circuit module 310 in which the position of selector 125 is controlled (via the relay) through a pressure switch or air flow sensor 320. According to some embodiments, anytime an air flow or pressure change is detected by sensor 320, power is provided by power supply 130 and selector 125 cycles between circuits A and B to divide the operating hours on each circuit. Thus, doubling the lifespan of the UV LED emitters 110 in UV LED device 300. By way of example and not limitation, air flow or pressure changes can be caused by the operation of one or more motor fans in the PTAC or split-air air-conditioning system to which the UV LED device 300 is connected. Advantageously, the position of selector 125 may toggle between positions A' and B' when the air flow raises above or falls below a certain threshold. By way of example and not limitation, when the air flow or pressure changes (e.g., increases) due to the operation of one or more motor fans in the PTAC or split-air air-conditioning system, selector 125 may switch to position A' to activate circuit A. When the air flow or pressure decreases (e.g., when the motor fan stops) and subsequently increases again (indicating that the motor fan is again operational), selector 125 may switch to position B' to activate circuit B instead of circuit A. Circuit A may be reactivated via selector 125 moving to position A' in the next air flow or pressure change cycle as described above.

Figure 4:
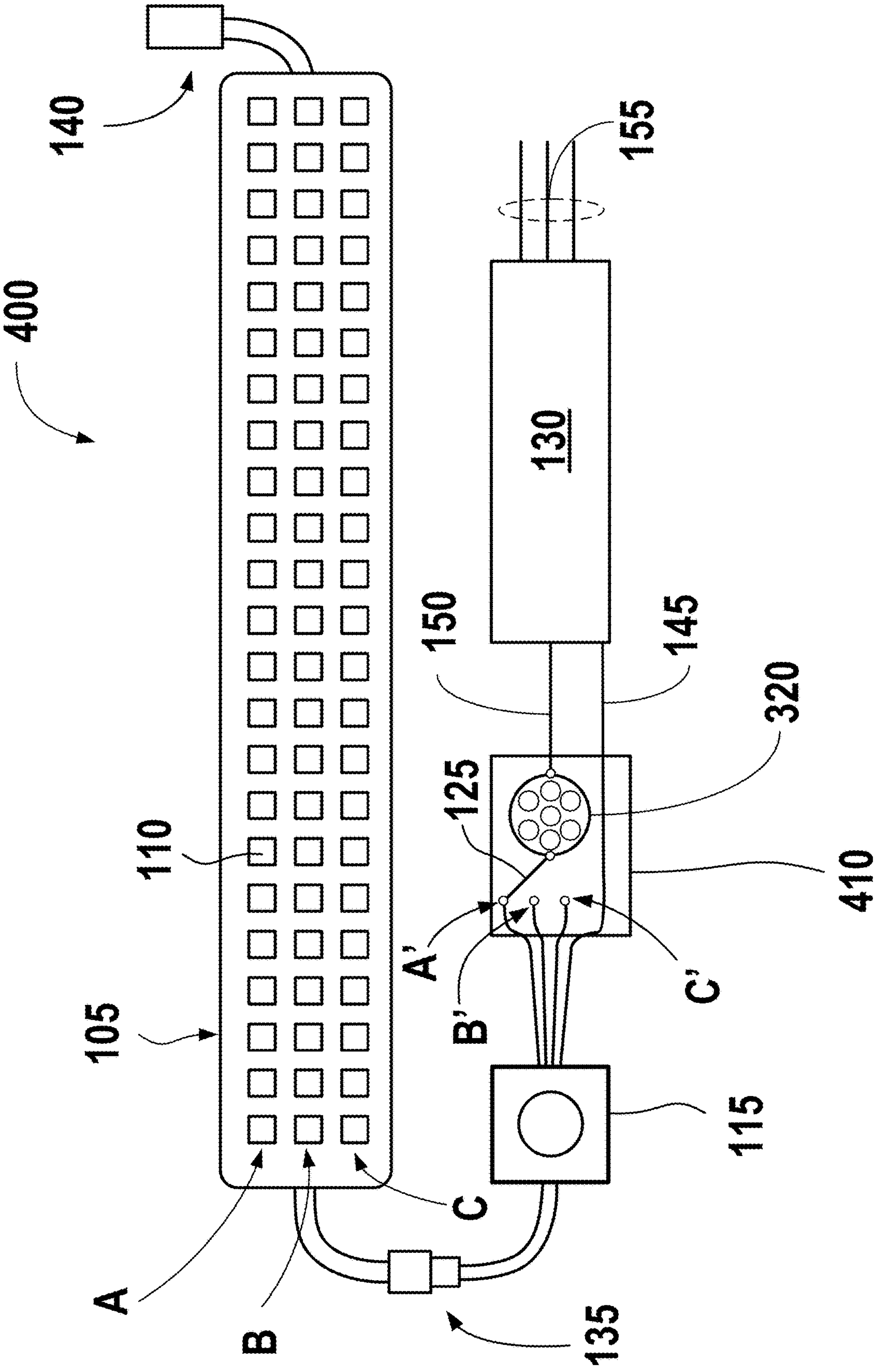
FIG. 4 is an illustration of a UV LED device with a tree-circuit configuration, in accordance with some embodiments.

According to some embodiments, FIG. 4 shows a UV LED device 400, which is a variant of UV LED device 300, with a three-circuit system as opposed to a two-circuit system. In this configuration, UV LED device 400 is capable of operating between three LED circuits (e.g., A, B, and C) instead of just two (e.g., A and B), to further increase the lifetime of UV LED emitters 110 by cutting their operating time to one third (e.g., ⅓) from one half (e.g., ½). According to some embodiments, the operation principles of UV LED device 400 is similar to that of UV LED device 300. The only difference is that UV LED device 400 cycles through circuits A, B, and C as opposed to circuits A and B within every air flow or pressure change cycle as described above.

Figure 5:
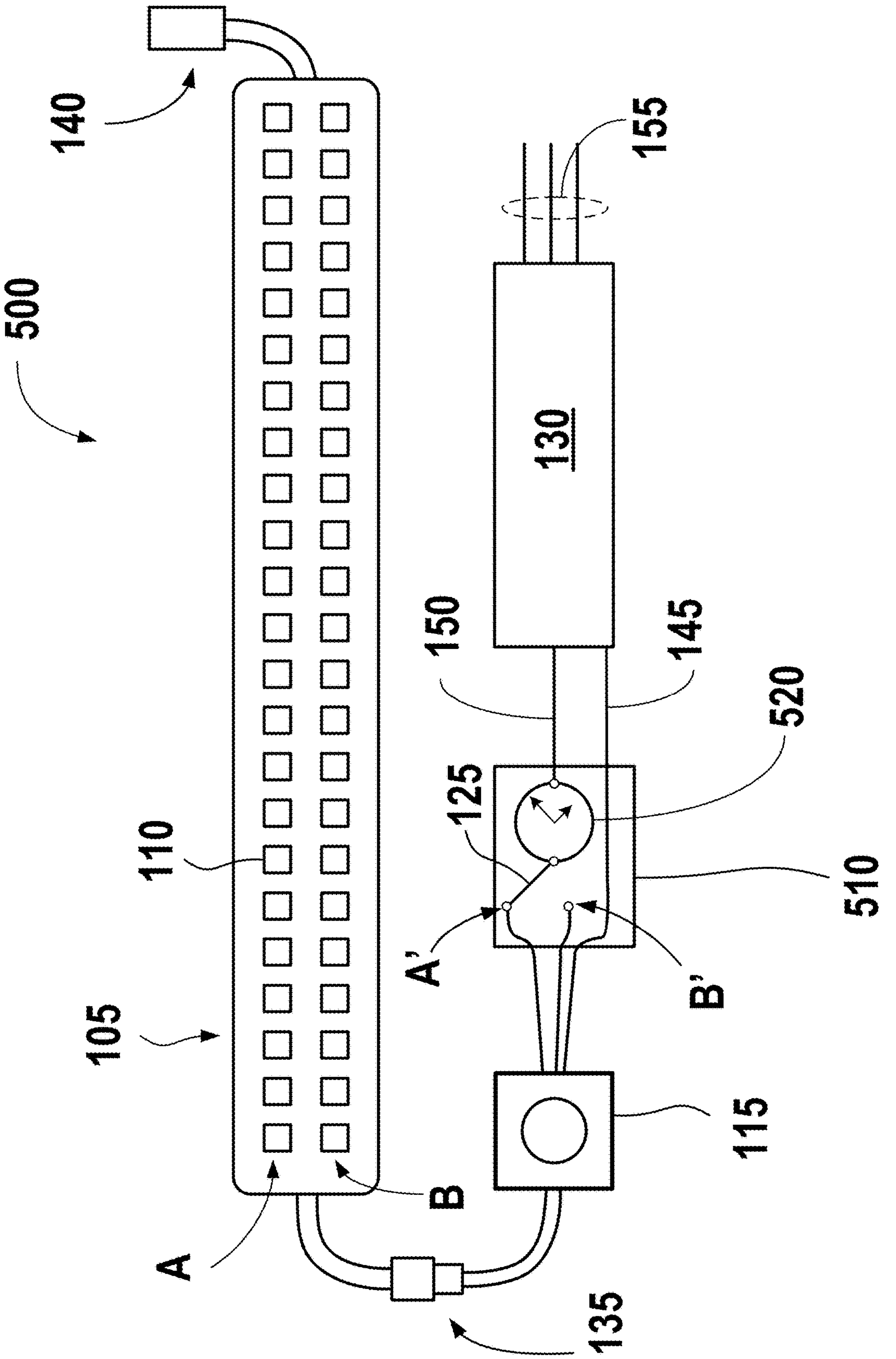
FIG. 5 is an illustration of a UV LED device with a two-circuit configuration, in accordance with some embodiments.

FIG. 5 shows a UV LED device 500, which has identical components to UV LED device 100 shown in FIG. 1 with the exception of an automatic alternating circuit module 510 in which the position of selector 125 between positions A' and B' is controlled (via the relay) through a timer 520. In this embodiment, the selector 125 activates circuits A and B based on a predetermined amount of time to ensure that circuits A and B are driven an equal amount of time during the lifetime of UV LED emitters 110. For example, circuit A may be activated for a predetermined amount of time once UV LED device 500 is powered ON. After the predetermined amount of time has elapsed, selector 125 switches to position B' to activate circuit B either while UV LED device 500 is powered ON or the next time the UV LED device 500 is powered ON. The selector may return to position A' once the predetermined amount of time has elapsed for a second time. The aforementioned process may repeat itself multiple times. In some embodiments, timer 520 may be programmed to any interval based on the lifetime of UV LED emitters 110 and the number of LED circuits on UV LED board of the UV LED device.

Figure 6:
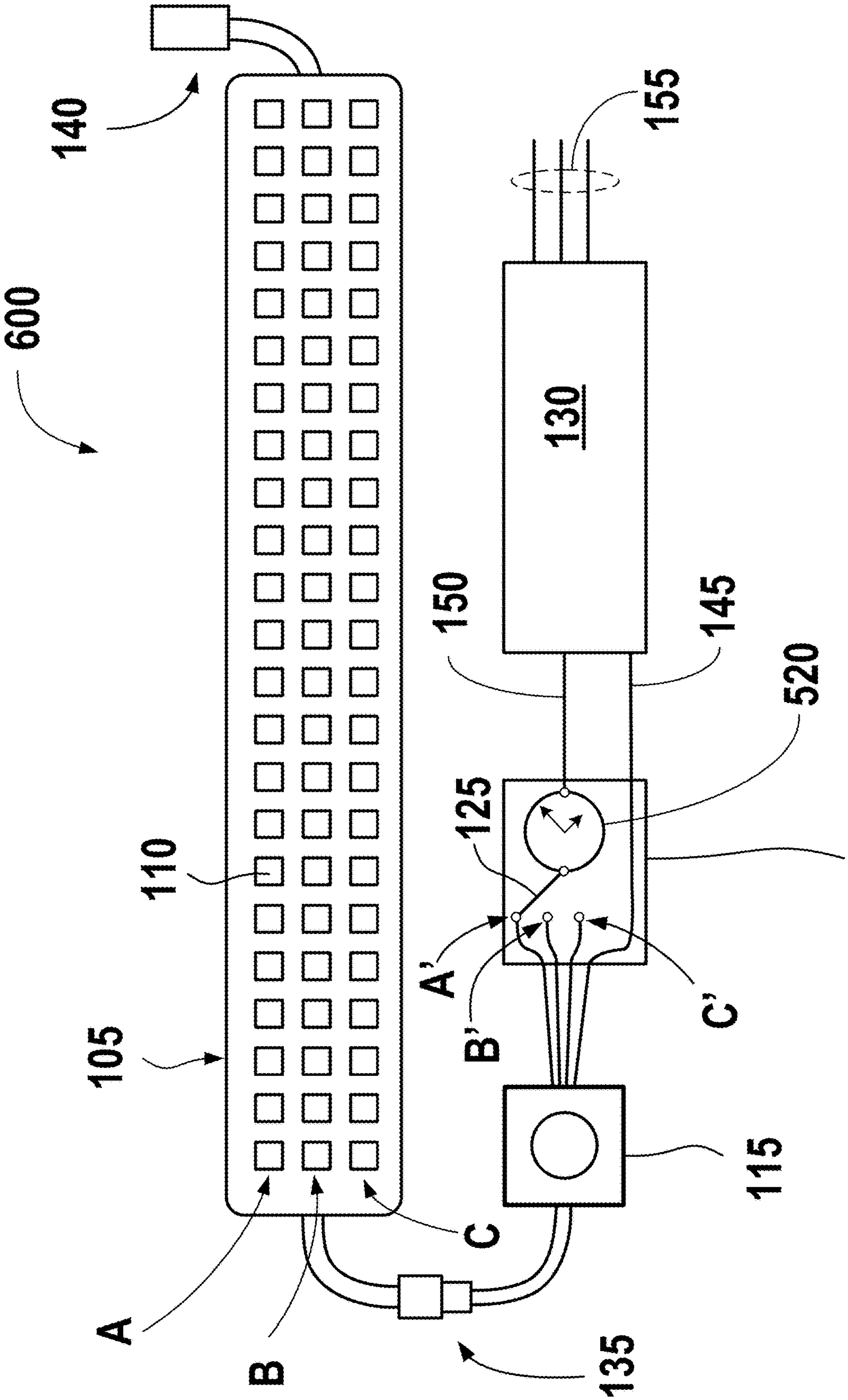
FIG. 6 is an illustration of a UV LED device with a tree-circuit configuration, in accordance with some embodiments.

Similarly to the UV LED devices discussed above in FIGS. 1 and 3, UV LED device 500 may be equipped with a greater number of LED circuits, as shown for example in FIG. 6 for UV LED device 600. The operating principle for UV LED device 600 is similar to that for UV LED device 500 discussed above with the exception that UV LED device 600, via automatic alternating circuit module 610 and timer 520, is now configured to switch between three LED circuits (A, B, and C) instead of just two (e.g., A and B). Advantageously, UV LED device 600 reduces the operation of UV LED emitters 110 to one third (e.g., ⅓) from one half (e.g., ½), effectively increasing further its total lifetime compared to UV LED device 500, which only utilizes LED circuits A and B.

Figure 7:
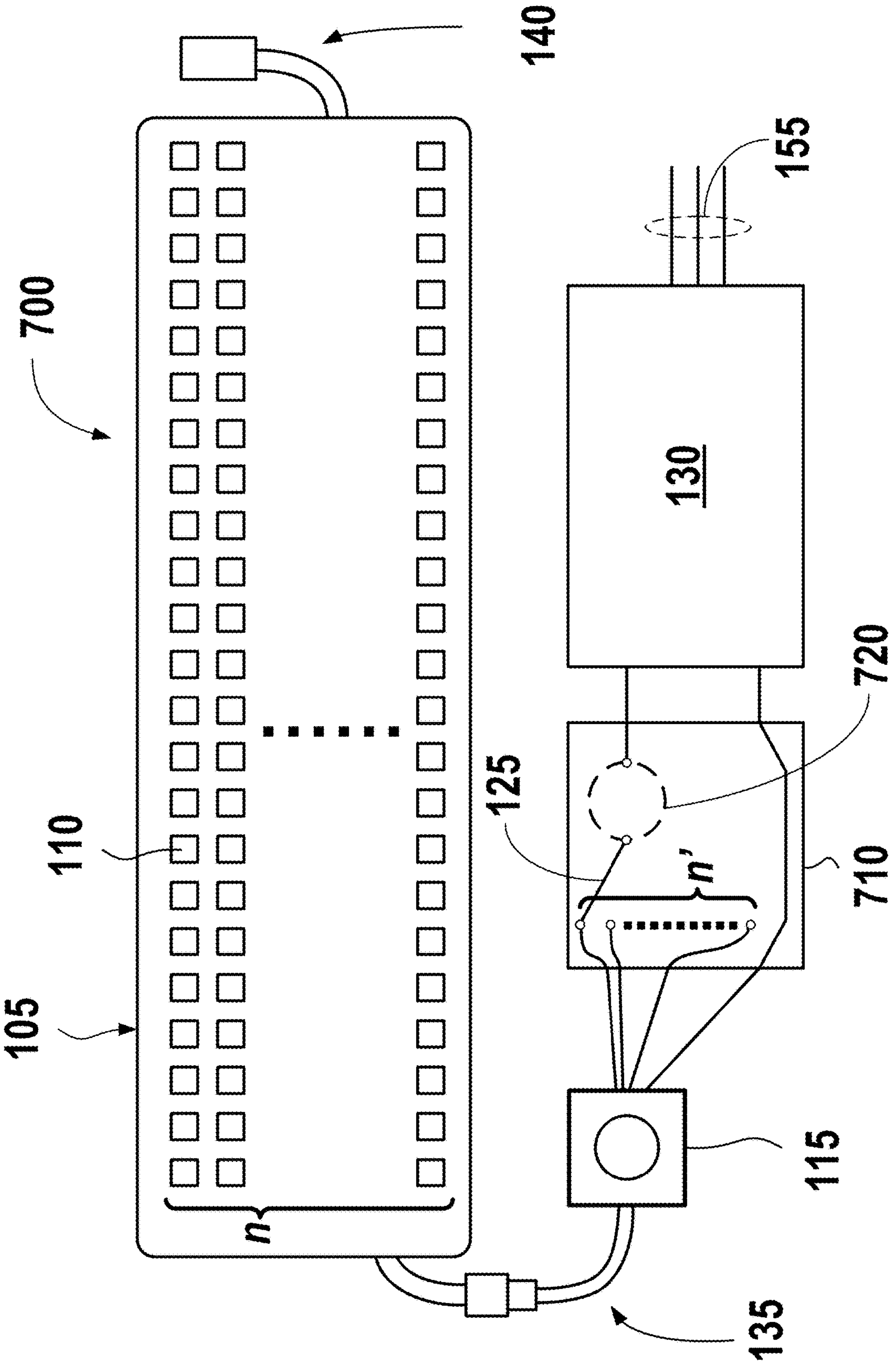
FIG. 7 is an illustration of a UV LED device with a n-circuit configuration, in accordance with some embodiments.

As discussed above, the UV LED devices presented herein may include a greater number of LED circuits with UV LED emitters 110 on their UV LED board 105 to further increase the lifetime of the UV LED device. For example, FIG. 7 shows such UV LED device (e.g., UV LED device 700) which includes n number of LED circuits. According to some embodiments, n is an integer equal to or greater than 2 (e.g., n≥2). Accordingly, UV LED device 700 is equipped with an automatic alternating circuit module 710 featuring a selector 125 which can move between n' positions to select any of the corresponding n LED circuits. According to some embodiments, each of the n' position corresponds to one of the n LED circuits; thus, n' is equal to n.

According to some embodiments, automatic alternating circuit module 710 may include a relay 720 that controls the position of connector 125. In some embodiments, relay 720 may incorporate a pressure switch or a flow sensor, like pressure switch or flow sensor 320 discussed above in connection to UV LED devices 300 and 400. In some embodiments, relay 720 may incorporate a timer, like timer 520 discussed above in connection to UV LED devices 500 and 600. In yet another embodiment, relay 720 may detect whether power is provided by power supply 130 and accordingly changing the position of connector 125 as discussed above in connection to the operation of UV LED devices 100 and 200. In some embodiments, relay 720 may incorporate any combination of the aforementioned components (e.g., timers, pressure switches, or a flow sensors). In some embodiments, power supply 130 may be optional if the power provided by the PTAC unit or split-air air-conditioning system does not require conversion or transformation.

Figure 9:
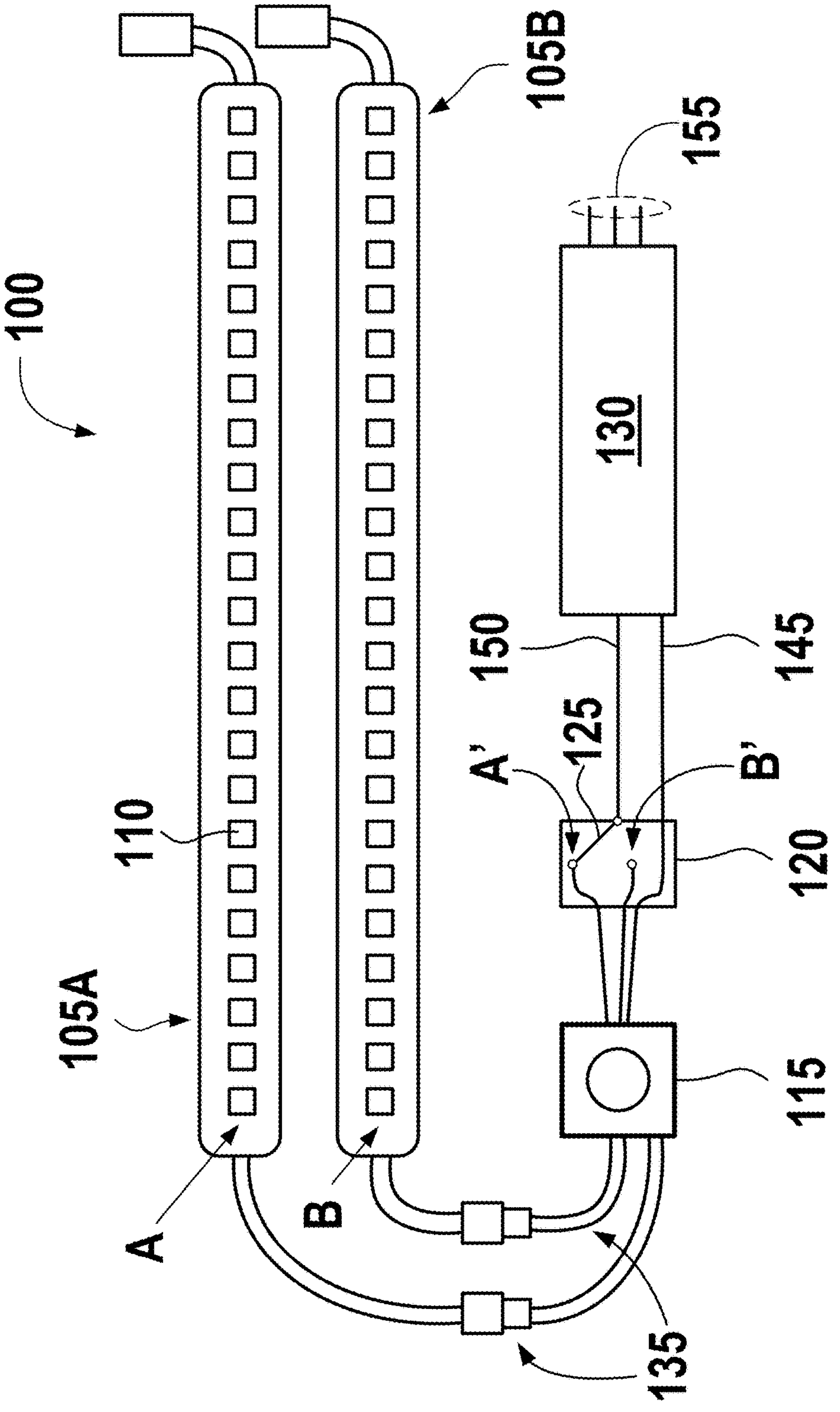
FIG. 9, is an illustration of a UV LED device with a two-circuit configuration on separate LED boards, in accordance with some embodiments.

In some embodiments, instead of forming n circuits on a single UV LED board 105, the n circuits may be distributed among respective LED boards that are electrically connected to the safety occupancy motion sensor 115 via multiple connections 135. By way of example and not limitation, FIG. 9 shows the UV LED device 100 from FIG. 1 in a configuration where circuits A and B are formed on different UV LED boards 105A and 105B according to the above description.

Software and Hardware Implementations

Figure 8:
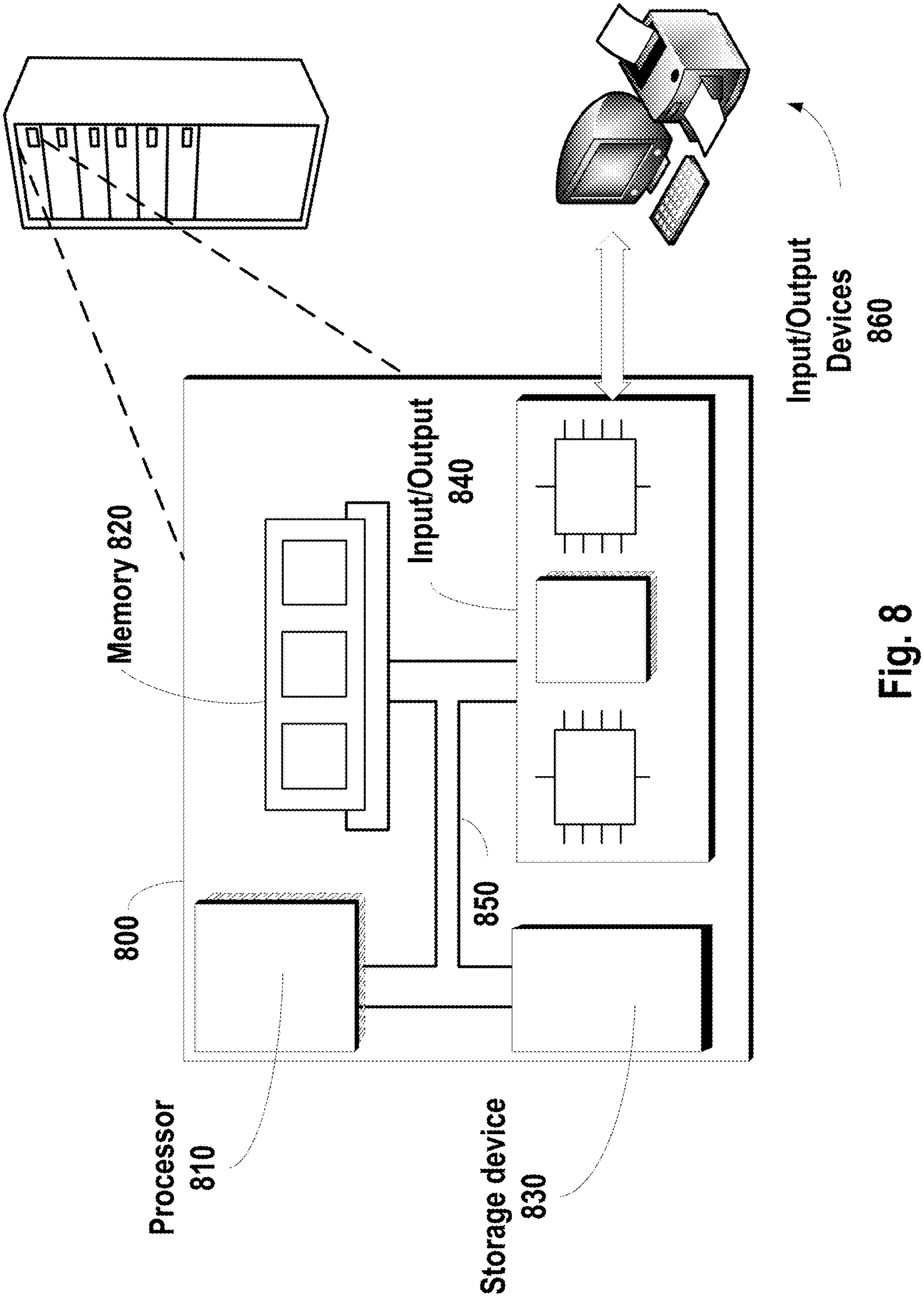
FIG. 8 is a block diagram of an example computer system, in accordance with some embodiments.

FIG. 8 is a block diagram of an example computer system 800 that may be used in implementing the technology described in this document. General-purpose computers, network appliances, mobile devices, or other electronic systems may also include at least portions of system 800. System 800 includes a processor 810, a memory 820, a storage device 830, and an input/output device 840. Each of components 810, 820, 830, and 840 may be interconnected, for example, using a system bus 850. Processor 810 is capable of processing instructions for execution within system 800. In some implementations, processor 810 is a single-threaded processor. In some implementations, processor 810 is a multi-threaded processor. In some implementations, processor 810 is a programmable (or reprogrammable) general purpose microprocessor or microcontroller. Processor 810 is capable of processing instructions stored in memory 820 or on storage device 830.

Memory 820 stores information within system 800. In some implementations, memory 820 is a non-transitory computer-readable medium. In some implementations, memory 820 is a volatile memory unit. In some implementations, memory 820 is a non-volatile memory unit.

Storage device 830 is capable of providing mass storage for system 800. In some implementations, storage device 830 is a non-transitory computer-readable medium. In various different implementations, storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more of a network interface device, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. Storage device 830 may be implemented in a distributed way over a network, for example as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A light emitting diode (LED) device, comprising:
- an LED printed circuit board (PCB) comprising two or more LED circuits, wherein each of the two or more LED circuits comprises a plurality of LED emitters;
- a module electrically coupled to the LED PCB, the module comprising:
  - a selector configured to move between two or more positions, each position activating one of the one or more LED circuits; and
  - a relay configured to control a movement of the selector between the two or more positions based on an input; and
- a power supply electrically coupled to the relay;
- wherein the input is a power OFF signal and a power ON signal sequence from the power supply
- wherein the power OFF signal and the power ON signal sequence from the power supply is provided by a timer.

2. The LED device of claim 1, further comprising a sensor electrically interposed between the PCB and the module.

3. The LED device of claim 2, wherein the sensor comprises a passive infrared sensor, a microwave occupancy sensor, or a motion sensor.

4. The LED device of claim 1, wherein the LED emitters when operated generate ultraviolet light with a wavelength between 100 nm and 400 nm.

5. The LED device of claim 1, wherein the LED device is a part of a packaged terminal air conditioner unit or split-air air-conditioning system.

6. A method of prolonging the lifetime of an LED device, the method comprising:
- providing an LED printed circuit board (PCB) comprising n independent LED circuits, wherein the LED PCB is electrically coupled to a module comprising a selector attached to a relay for activating one of the n LED circuits at a time; and
- sequentially activating each of the n LED circuits by moving the selector based on an input signal to the relay.

7. The method of claim 6, wherein sequentially activating each of the n LED circuits comprises moving the selector to one of n' positions corresponding to the n independent LED circuits.

8. The method of claim 7, wherein n and n' are integers equal to or greater than two.

9. The method of claim 6, wherein activating each of the n LED circuits comprises firing a plurality of LED emitters in an activated LED circuit to generate ultraviolet (UV) radiation that sanitizes air flowing in a path of the UV radiation.

10. The method of claim 6, wherein activating each of the n LED circuits comprises firing a plurality of LED emitters in an activated LED circuit to generate ultraviolet (UV) radiation with a wavelength between 100 nm and 400 nm.

11. The method of claim 10, further comprising:
- determining with a sensor whether a person obstructs a path of the UV radiation; and
- deactivating the activated LED circuit upon determining that the path of the UV radiation is obstructed.

12. The method of claim 11, wherein the sensor comprises a passive infrared sensor, a microwave occupancy sensor, or a motion sensor.

13. The method of claim 6, wherein the input signal comprises a sequence of a power OFF signal and a power ON signal from a power supply.

14. The method of claim 6, wherein the input signal comprises a signal from a timer.

15. The method of claim 6, wherein the input signal comprises a signal from a pressure switch configured to measure pressure changes caused by an operation of a fan motor external to the LED device.

16. The method of claim 6, wherein the input signal comprises a signal from an air flow sensor configured to measure air flow changes caused by an operation of a fan motor external to the LED device.

17. A light emitting diode (LED) device, comprising:
- an LED printed circuit board (PCB) comprising two or more LED circuits, wherein each of the two or more LED circuits comprises a plurality of LED emitters;
- a module electrically coupled to the LED PCB, the module comprising:
  - a selector configured to move between two or more positions, each position activating one of the one or more LED circuits; and
  - a relay configured to control a movement of the selector between the two or more positions based on an input;
- a power supply electrically coupled to the relay; and
- a sensor electrically interposed between the PCB and the module.

18. The LED device of claim 17, wherein the sensor comprises a passive infrared sensor, a microwave occupancy sensor, or a motion sensor.

19. The LED device of claim 17, wherein the input is a signal from a timer.

20. The LED device of claim 17, wherein the input is a signal from a pressure switch.

21. The LED device of claim 17, wherein the input is a signal from an air flow sensor.

22. The LED device of claim 17, wherein the input is a power OFF signal and a power ON signal sequence from the power supply.

23. The LED device of claim 17, wherein the LED emitters when operated generate ultraviolet light with a wavelength between 100 nm and 400 nm.

24. The LED device of claim 17, wherein the LED device is a part of a packaged terminal air conditioner unit or split-air air-conditioning system.

* * * * *